W. H. OLDER.
Wheel Cultivator.

No. 41,389. Patented Jan. 26, 1864.

Witnesses:

Inventor:

UNITED STATES PATENT OFFICE.

WILLIAM H. OLDER, OF PACKWAUKEE, WISCONSIN.

IMPROVEMENT IN CULTIVATORS.

Specification forming part of Letters Patent No. 41,389, dated January 26, 1864; antedated January 20, 1864.

*To all whom it may concern:*

Be it known that I, W. H. OLDER, of Packwaukee, in the county of Marquette and State of Wisconsin, have invented a new and Improved Cultivator; and I do hereby declare that the following is a full, clear, and exact description of the same, reference being had to the accompanying drawings, making a part of this specification, in which—

Figure 1:
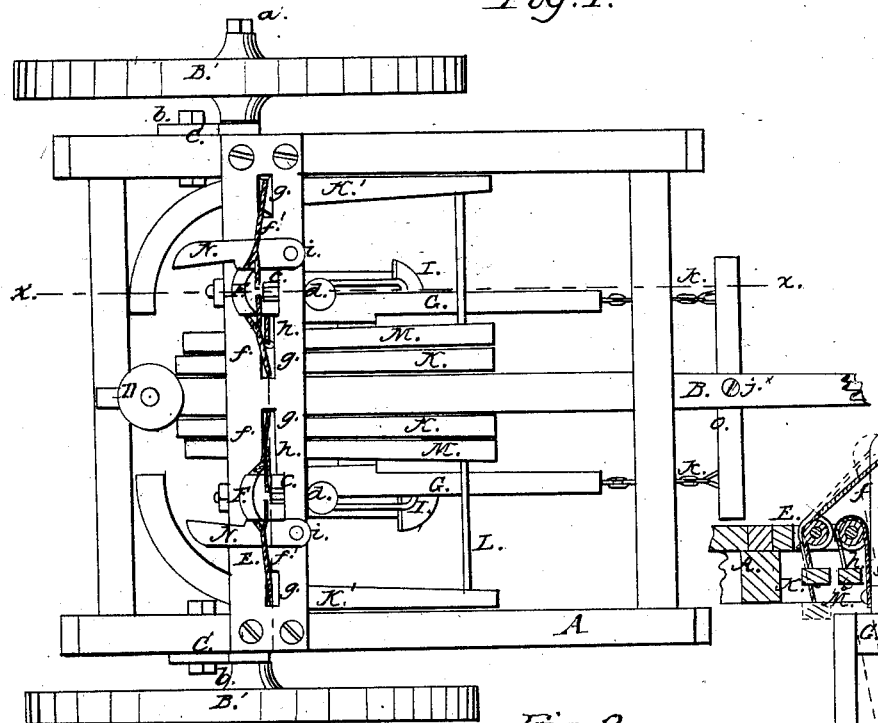
Figure 3:
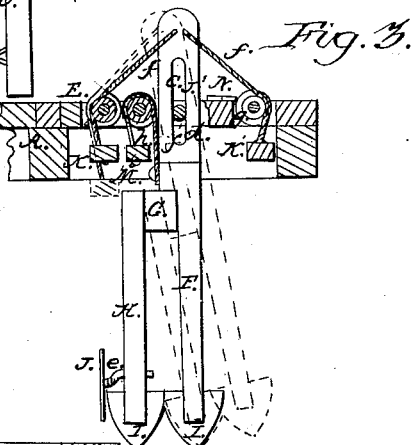
Figure 2:
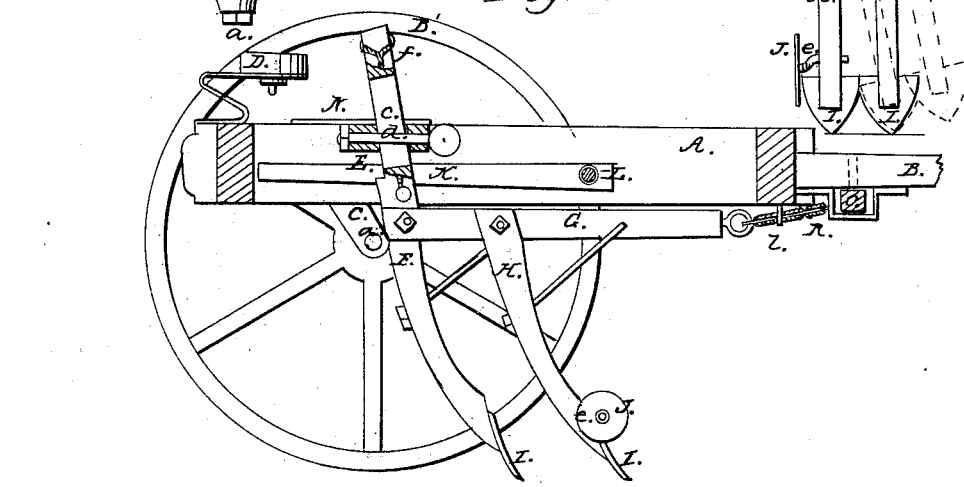

Figure 1 is a plan or top view of my invention; Fig. 2, a side sectional view of the same, taken in the line $x\ x$, Fig. 1; Fig. 3, a transverse section of a portion of the same, taken in the line $y\ y$, Fig. 1.

Similar letters of reference indicate corresponding parts in the several figures.

This invention relates to an improved cultivator of that class which are designed for cultivating corn.

The object of the invention is to obtain a cultivator of the class specified which will have its plows under the complete control of the driver, so that they can be raised or lowered or adjusted laterally and operated solely by the feet.

To enable those skilled in the art to fully understand and construct my invention, I will proceed to describe it.

A represents a rectangular frame, having a draft-pole, B, attached to it, and B' B' are two wheels, on which the frame A is mounted. These wheels are fitted on short axles $a\ a$, which are attached at right angles to plates C C, the latter being secured to the sides of the frame A by bolts $b$, arranged in such a manner that the axles $a$ may be adjusted higher or lower and more or less forward or backward, so as to properly balance the machine.

On the back part of the frame A the driver's seat D is secured, and E is a bar fitted and permanently secured transversely in the frame A. This bar E has two inclined bars or plow-standards, F F, fitted loosely in it, so that they may freely rise and fall therein. These standards have longitudinal oblong slots $c$ made in them, through which and the bar E bolts $d$ pass, the bolts serving as guides for the standards. (See Figs. 2 and 3.)

Each standard F has a beam, G, attached to it, said beam having a horizontal position, and each beam having a standard, H, attached to it, the standards H being a short distance in front of the standards F, but attached to the opposite side of the beams. Each standard has a shovel-plow, I, secured to its lower end, and to the inner sides of the standards H, at the upper ends of the plows I, there are attached circular disks J—one to each standard. These disks are allowed to turn freely on pins or axes $e$, and said disks serve as guards to prevent the plows I of the standard H from casting clods of earth, stones, &c., upon the plants. The standards F do not require these guards, as they are not in close proximity to the plants.

Each standard F has three cords, belts, or chains, $f\ f'\ f''$, attached to it. The cords $f\ f'$ are attached to the upper ends of the standards, and pass around pulleys $g\ g$ in the bar E, and are connected to treadles K K', the front ends of which are fitted loosely on a rod, L, placed transversely in the frame A. The cords $f''$ are attached to the standards F below the slots $c$, and said cords pass over pulleys $h$ in the bar E, and, extending down, are attached to a treadle, M. (See Fig. 3.) These treadles K K' M are all within reach of the driver on the seat D.

N N are two plates, which are placed on the bar E and secured thereto by pins $i$. These plates serve as catches, and keep the standards F in an elevated position when desired by being shoved into slots $j$ in the outer sides of said standards. (See Fig. 3.) By this means the plows, when not designed to be used, may all be held above the surface of the ground.

To the back part of the draft-pole B, just in front of the frame A, the double-tree O is attached by a central bolt, $j'$. The ends of the double-tree are connected by chains $k$ to the front ends of the beams G G, and said chains are also attached to the front part of the frame A, as shown at $t$, Fig. 2.

The operation is as follows: The machine is drawn along so that the two beams G G will be at opposite sides of a row of corn, the plows I of the standards H being near the corn or by the side of it. The guards J, as before stated, prevent clods, stones, &c., being cast on the plants. The driver, from his seat D, may elevate the plows at any time by depressing the treadles M, and the plows may be moved either to the right or left by depressing the treadles K K', the treadle K, when depressed, throwing the plows outward from the row of corn, and the treadles K' throwing them inward or toward the row of corn. The operation of the treadles K is shown in red in Fig. 3. The catches N may also be adjusted by the feet of the driver.

Thus it will be seen that by this simple arrangement the plows are placed under complete control of the driver. They may be raised or lowered, and also moved laterally. The chains $k\ k$ admit of the beams G turning freely or moving in any direction required under the operation of the treadles K K' M.

Having thus described my invention, what I claim as new, and desire to secure by Letters Patent, is—

The arrangement of the standards F F and treadles K K' M, as shown and described, to wit: the standards being fitted in the bar E, with the bolts $d$ passing through longitudinal oblong slots $c$ therein, and the treadles connected to the standards by means of the cords, bolts, or chains $f\ f'\ f''$, all arranged to operate as set forth.

WILLIAM H. OLDER.

Witnesses:
ALVIRA SMITH,
MARTHA PERKINS.